United States Patent Office 3,752,783
Patented Aug. 14, 1973

3,752,783
WATER- AND OIL-REPELLENT COMPOSITIONS CONTAINING FLUORO RESINS AND WATER SOLUBLE SALT OF GUANIDINE
Akitoshi Iwantani, Osaka-fu, Japan, assignor to Daikin Kogyo Kabushiki Kaisha, Osaka-shi, Japan
No Drawing. Filed July 12, 1971, Ser. No. 161,890
Claims priority, application Japan, July 14, 1970, 45/62,278; May 1, 1971, 46/29,012; May 18, 1971, 46/33,818
Int. Cl. C08f 45/24
U.S. Cl. 260—29.6 F
9 Claims

ABSTRACT OF THE DISCLOSURE

The water- and oil-repellent composition of the invention comprises an aqueous medium having dispersed therein a fluorine-containing polymer having a perfluoroalkyl side chain of 3 to 21 carbon atoms in a concentration of 0.05 to 10 weight percent, a water-soluble salt of guanidine in the range of 0.001 to 10 times the weight of said fluorine-containing polymer and an antistatic agent in the range of 0.0003 to 20 times the weight of said fluorine-containing polymer.

---

This invention relates to oil- and water-repellent compositions, and more particularly to the improvement of fluorochemical compositions for imparting oil and water repellency to fibrous materials.

It is well known in the art that the surface of fibrous materials treated with a certain kind of fluorine-containing polymers displays oil and water-repellency. Such fluorine-containing polymers having the above property are those having a side chain containing a perfluoroalkyl group of 3 to 21 carbon atoms.

However, the fibrous materials treated with the fluorine-containing polymers have the undesirable property of accumulating electrostatic charges developed by friction, which renders them susceptible to soil. To overcome this disadvantage attempts have been made to use antistatic agents in combination with the fluorine-containing polymers, but the water repellency of the fibrous materials treated therewith lowers due to the hydrophilic property of the antistatic agents.

To eliminate the above drawbacks we have studied the improvement of a composition containing fluorine-containing polymer and antistatic agent by adding numerous compounds of various kinds to the composition. As a result it has been found that when a water-soluble salt such as ammonium chloride is added to the composition the fibrous materials treated with the resultant composition display excellent oil- and water-repellent properties and high order of antistatic property. According to this method, however, it is inevitable to use the antistatic agent in a large amount if a high order of antistatic property is to be obtained, this impairing the color fastness to rubbing of fibrous materials dyed with a disperse dye and thereby limiting the application of the composition to narrow range of the uses.

Further researches conducted by the present inventor have revealed that when a guanidine salt is selectively added in combination with an antistatic agent to the water- and oil-repellent composition of this kind the fabric materials treated therewith display high order of antistatic property as well as excellent water- and oil-repellent properties without any reduction in color fastness to rubbing.

The present invention is based on the above new discovery and main object thereof is accordingly to provide a water- and oil-repellent composition which makes it possible to impart not only excellent water- and oil-repellent properties but also excellent antistatic property to fibrous materials without any adverse effect on color fastness to rubbing of the fibrous material dyed with disperse dyes.

These and other objects of the invention will be apparent from the following description.

The oil- and water-repellent composition of the invention comprises an aqueous medium having dispersed therein a fluorine-containing polymer having a perfluoroalkyl side chain of 3 to 21 carbon atoms in a concentration of 0.05 to 10 weight percent, a water-soluble salt of guanidine in the range of 0.001 to 10 times the weight of said fluorine-containing polymer and an antistatic agent in the range of 0.0003 to 20 times the weight of said fluorine-containing polymer.

According to the present invention it is essential to add a water-soluble guanidine salt in combination with an antistatic agent, which enables the fibrous materials treated with the present composition to display high order of oil and water repellency and antistatic property free of deterioration in color fastness to rubbing of the fibrous materials dyed with disperse dyes. Such outstanding effect can not be obtained with water-soluble salt other than the guanidine salts, and use of the other salts lowers color fastness to rubbing of the dyed fibrous materials.

The guanidine salts used in the invention are water-soluble guanidine salts of various acids. The acids include (1) inorganic mono- or poly-basic acids such as hydrochloric acid, nitric acid, carbonic acid, sulfuric acid, phosphoric acid, etc.; (2) organic monobasic acids such as acetic acid, formic acid, gluconic acid, lactonic acid, etc. (3) organic polybasic acids such as oxalic acid, malonic acid, succinic acid, malic acid, maleic acid, methylmalonic acid, ethylmalonic acid, tartaric acid, vinaconic acid, glutaric acid, glutaconic acid, saccharic acid, itaconic acid, adipic acid, phthalic acid, dimer of acrylic acid and the like dibasic acids, citric acid, aconitic acid, tricarballylic acid, campholonic acid, trimer of acrylic acid, trimer of maleic acid and the like tribasic acids, and polyacrylic acid of a polymerization degree of 4 to 10,000, polymaleic acid of a polymerization degree of 4 to 10,000, etc. Of the guanidine salts of these acids the most preferable are guanidine salts of organic monobasic acids and organic polybasic acids, since such salts ensure more excellent antistatic property than guanidine salts of inorganic acids. The guanidine salts of these acids are easily available and can be prepared in conventional manner, for example by reacting guanidine with an equivalent or excess amount of acid in the presence of a liquid medium such as water or a mixture of water and water-soluble organic solvents. The reaction can be conducted at a room temperature or a moderately elevated temperature of less than 100° C. When polybasic acid is used the reaction product contains byproducts other than guanidine salts predominantly produced, but there is no need to separate such byproducts because the presence thereof in mixture with the salts gives no adverse effect on the properties of the present composition.

The antistatic agents used in combination with the above guanidine salts include those which have been used as antistatic agents for fabric materials. Examples thereof are as follows:

(1) Polymers of acrylamide derivatives such as a polymer of a compound having the formula of

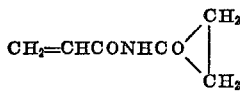

or

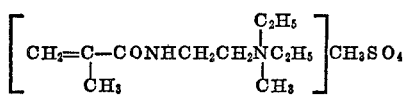

(2) Polymers of acrylic ester derivatives such as a polymer of quaternary ammonium salts of diethylaminoethyl methacrylate quaternized with dimethyl sulfuric acid;

(3) Polymers of vinyl ether such as a polymer of a compound having a formula of

(4) Vinyl pyridine derivatives such as poly-2-vinyl pyridine quaternized with p-toluene sulfonic acid;

(5) Polyamine resins such as polyethylene glycol polyamine obtained by reacting a polyamine with a reaction product of polyethylene glycol and epichlorohydrin;

(6) Cationic resins such as a polymer of a compound having the formula of

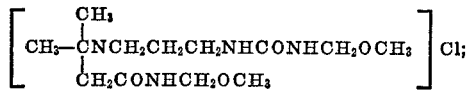

(7) Amide-based antistatic agents such as N-methoxymethyl polyamide, N,N'-dimethyl-N,N'-bis(hydroxymethyl) adipic amide;

(8) Amphoteric external permanent antistatic agents such as a compound having the formula of

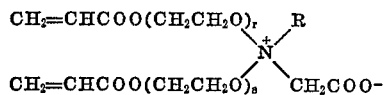

wherein R is an alkyl and $r$ and $s$ are integers of 1 to 100 respectively; and (9) Polymers containing in the molecule alkylene glycol chain having the formula of $-CH_2CH_2-O-$ or $$-CH(CH_3)CH_2O-,$$

such as polymers of the following monomers (a) to (q) below.

(a) $R^1O(CH_2CH_2O)_nOCCR^2=CH_2$
(b) $CH_2=CR^2COO(CH_2CH_2O)_nOCCR^2=CH_2$
(c) $R^1O[CH(CH_3)CH_2O]_nOCCR^2=CH_2$
(d) $CH_2=CR^2COO[CH(CH_3)CH_2O]_nOCCR^2=CH_2$
(e) $R^1O(CH_2CH_2O)_n[CH(CH_3)CH_2O]_mOCCR^2=CH_2$
(f) $CH_2=CR^2COO(CH_2CH_2O)_n[CH(CH_3)CH_2O]_mOCCR^2=CH_2$

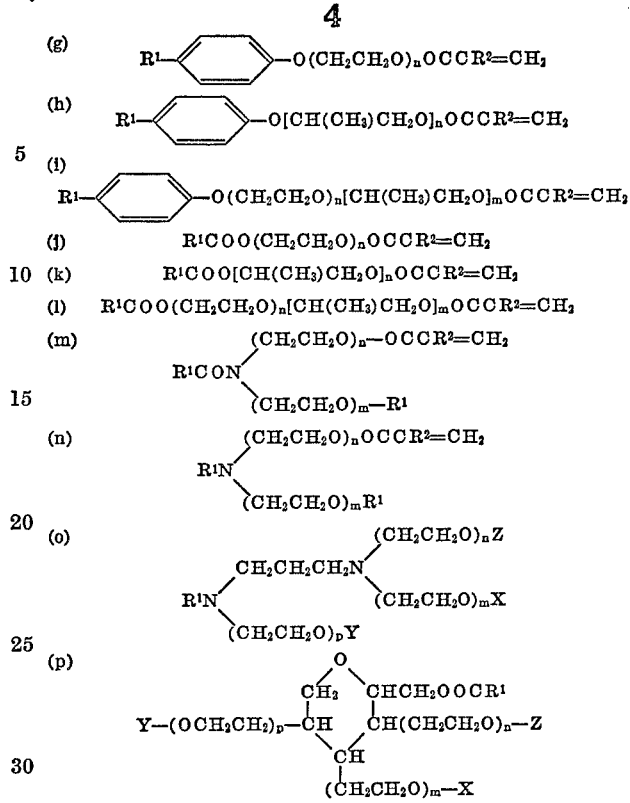

(q) $HS[CH_2CHR^2COO(CH_2CH_2O)_nCOCHR^2CH_2S]_qH$ wherein $R^1$ is hydrogen or an alkyl group of 1 to 20 carbon atoms and $R^2$ is hydrogen or methyl. At least one of X, Y and Z represents $-OCCR^2=CH_2$, $-CH=CH_2$ or $CCl=CH_2$ and the other are $R^1$ or $R^1CO$, $R^1$ and $R^2$ being defined above. Coincidences, $n$, $m$ and $p$ are a number of from 1 to 100 respectively, and $q$ is a number of from 1 to 200.

Of these antistatic agents the polymers (9) which contain alkylene glycol chain in the molecule are the most preferable since they ensure the most preferable effects when used in combination with guanidine salts disclosed before. Such polymers (9) include homopolymers of the monomers (a) to (q) above, copolymers thereof and copolymers of such monomers (a) to (q) with other copolymerizable monomers containing the monomers (a) to (q) in the amount of at least 70 weight percent. Examples of the copolymerizable monomers are (1) acrylic acid, methacrylic acid or such esters thereof as methyl, ethyl, propyl, butyl, isobutyl, 2-ethylhexyl, hexyl, decyl, lauryl, stearyl, etc.; (2) vinyl esters of aliphatic acids, such as vinyl acetate, vinyl propionate, vinyl caprylate, vinyl laurate, vinyl stearate, etc.; (3) styrene or styrene compounds, such as α-methylstyrene, p-methylstyrene, etc.; (4) halogenated vinyl or vinylidene compounds such as vinyl fluoride, vinyl chloride, vinyl bromide, vinylidene fluoride, vinylidene chloride, etc.; (5) allyl esters of aliphatic acids, such as allyl heptanoate, allyl caproate, allyl caprylate, etc.; (6) vinylalkyl ketones, such as, vinylmethyl ketone, vinylethyl ketone, etc.; (7) acrylamides, such as N-methylol acrylamide, N-methylol methacrylamide, glycidyl acrylate, glycidyl methacrylate, etc.; and (8) diene compounds, such as butadiene, 2,3-dichloro-1,3-butadiene, isoprene, etc. Polymerization reaction for producing these polymers may be carried out by the method conventional to the polymerization reaction for various vinyl monomers. According to one of preferred methods, for instance, at least one of the monomers is polymerized with stirring in organic solvents to produce the desired polymers.

Fluorine-containing polymers used in the invention include those having a side chain containing a perfluoroalkyl group of 3 to 21 carbon atoms, and examples of such polymers are homopolymers or copolymers of the following monomers:

| No. | Formula |
|---|---|
| (1) | $R_fSO_2NR^4OOCCR^5=CH_2$ with $R^3$ on N |
| (2) | $R_f(CH_2)_nOOCCR^5=CH_2$ |
| (3) | $R_fCONR^4OOCCR^5=CH_2$ with $R^3$ on N |
| (4) | $R_fCH_2CHCH_2OOCCR^5=CH_2$ with OH |
| (5) | $R_fCH_2CHCH_2OOCCR^5=CH_2$ with $OOCR^6$ |
| (6) | $R_fCH_2COOCH=CH_2$ |
| (7) | $R_fCH=CH(CH_2)_nOOCCR^5=CH_2$ | wherein $R_f$ is a perfluoroalkyl of 3 to 21 carbon atoms, $R^3$ is hydrogen or an alkyl of 1 to 10 carbon atoms, $R^4$ is an alkylene of 1 to 10 carbon atoms, $R^5$ is hydrogen or methyl, $R^6$ is an alkyl of 1 to 17 carbon atoms and $n$ is an integer of 1 to 10.

These monomers and polymers thereof are known in the art. For example, polymers of the monomer (1) are disclosed in British Pat. No. 857,689 and No. 904,262, those of the monomer (2) are in U.S. Pats. No. 2,642,416 and No. 3,102,103 and British Pat. No. 1,011,612, those of the monomer (3) are in U.S. Pat. No. 2,764,603, those of the monomers (4) are in British Pat. No. 1,095,900, those of the monomers (5) are in British Pat. No. 1,123,379, those of the monomer (6) are in U.S. Pat. No. 2,592,609 and those of the monomer (7) are in British Pat. No. 1,101,049. Of these polymers homopolymers or copolymers of the monomers (4) and (5) are most desirable in the invention.

Copolymers of the above fluorine-containing monomers include those prepared by copolymerizing the above monomers with one another or by copolymerizing the above monomers with copolymerizable monomers of other kinds. Examples of the copolymerizable monomers of other kinds are (1) acrylic acid, methacrylic acid or such esters thereof as methyl, ethyl, propyl, butyl, isobutyl, 2-ethylhexyl, hexyl, decyl, lauryl, stearyl, etc.; (2) vinyl esters of aliphatic acids, such as vinyl acetate, vinyl propionate, vinyl caprylate, vinyl laurate, vinyl stearate, etc.; (3) styrene or styrene compounds, such as α-methylstyrene, p-methylstyrene, etc.; (4) halogenated vinyl or vinylidene compounds such as vinyl fluoride, vinyl chloride, vinyl bromide, vinylidene fluoride, vinylidene chloride, etc.; (5) allyl esters of aliphatic acids, such as allyl heptanoate, allyl caproate, allyl caprylate, etc.; (6) vinylalkyl ketones, such as, vinylmethyl ketone, vinylethyl ketone, etc.; (7) acrylamides, such as N-methylol acrylamide, methylol methacrylamide, glycidyl acrylate, glycidyl methacrylate, etc.; and (8) diene compounds, such as butadiene, 2,3-dichloro-1,3-butadiene, isoprene, etc. Of these comonomers acrylic acid, methacrylic acid and esters thereof are most desirable. The copolymers used in the invention contain the fluorine-containing monomers in at least 25 weight percent, preferably in more than 50 weight percent.

Polymerization of the fluorine-containing monomers may be carried out by the methods known to the art, for example, by bulk polymerization, emulsion polymerization and suspension polymerization, using either heat, free-radical catalysts, ultraviolet light or ionizing radiations. Of these methods, the most desirable is emulsion polymerization, since stable aqueous polymer emulsion can be obtained by such a method. The emulsion polymerization may be carried out, for example, by polymerizing fluorine-containing monomers in an aqueous medium containing dispersant and radical initiator. As the dispersant various cationic or anionic surfactants may be used. Examples thereof are octadecyltrimethyl ammonium acetate, dodecyltrimethyl ammonium bromide, tetradodecyltrimethyl ammonium chloride, (dodecylmethylbenzyl)-trimethyl ammonium chloride, (dodecyl-benzyl)-trimethyl ammonium bromide, pentadecafluorooctyl ammonium chloride and like cationic surfactants, and sodium alkyl ($C_{12}$–$C_{18}$) benzene sulfonate, sodium alkyl naphthalene sulfonate, sodium oleate sodium alkyl ($C_{16}$–$C_{18}$) acetate, ammonium perfluoroalkanonate and like anionic surfactants.

The aqueous oil- and water-repellent composition of the invention may be prepared easily by dissolving water-soluble guanidine salts in combination with antistatic agent in aqueous polymer emulsion containing fluorine-containing polymers obtained by emulsion polymerization of the fluorine-containing monomers aforementioned or obtained by dispersing fluorine-containing polymers in water. The composition may contain the fluorine-containing polymer in the range of 0.05 to 10 weight percent, preferably 0.3 to 5 weight percent, based on the total weight of the composition. The water-soluble guanidine salt is contained in the composition in the range of 0.001 to 10 times, preferably 0.5 to 5 times, the weight of the fluorine-containing polymer in the composition. The lesser amount of the salts results in no or poor improvement of water repellency, while larger amount adversely affects the stability of the resultant composition without any better effects.

The antistatic agents may be added to the composition in the range of 0.0003 to 20 times, preferably 0.5 to 10 times, the weight of the fluorine-containing polymer in the composition.

The present water- and oil-repellent composition may preferably have a total solid concentration of not higher than 50 weight percent.

Fibrous materials to be treated with the present composition are, for example, yarn, textile, knit, felt and nonwoven fabric made of various fibers, leather and paper. Such fibers include cellulose, silk, wool and like natural fibers; cellulose acetate, cellulose propionate and like artificial fibers, and polyamide, polyester, polyacrylonitrile, polyvinylalcohol and like synthetic fibers.

The fibrous materials are wetted with the present composition by coating, dipping, spraying, padding and like conventional methods, so as to attach the fluorine-containing polymer to the fibrous materials in the amount of 0.01 to 5 weight percent in terms of dry weight, based on the weight of the fabric. The wetted fibrous materials are then dried, and cured as required. After curing the fibrous materials may be washed with neutral detergents as required.

To the present composition there may be added wetting agents, such as, isopropyl alcohol, isobutyl alcohol etc. and various finishing agents for fibers, such as melamine-formaldehyde resin, urea-formaldehyde resin, triazine compounds, triazol compounds, ethylene-urea compounds, glyoxal compounds, uron compounds, polymethyl acrylate, polybutyl acrylate, polyvinyl acetate, polyvinyl alcohol, etc.

For a better understanding of the invention examples are given below, in which all parts and percentages are by weight, and oil repellency, water repellency, electrostatic voltage and color fastness to rubbing are measured by the following methods.

Oil repellency: AATCC 118–1966T

Water repellency: AATCC 22–1952

Electrostatic voltage: Electrostatic voltage was measured by using Hayker's static machine described in Am. Dyestuff Rep. 164 (1951)

Color fastness to rubbing: JIS–L–0849

EXAMPLE 1

(a) Preparation of the copolymer of $(CF_3)_2CF(CF_2)_6CH_2\text{—}CH(OH)CH_2OOCCH=CH_2$ and 2-ethylhexyl methacrylate In a 300-ml. 4-necked flask equipped with a reflux condenser, thermometer, dropping funnel and agitator were placed 36 grams of $(CH_3)_2CF(CF_2)_6CH_2CH(OH)CH_2OOCCH=CH_2$, 0.34 gram of N-methylolacrylamide, 31.5 grams of 2-ethylhexyl methacrylate and 45 grams of deoxidated water, 7 grams of acetone and 6.4 grams of a 62:38 weight ratio mixture of dimethyloctadecyl amine and glacial acetic acid. The resultant mixture was thoroughly stirred in nitrogen stream and gradually heated to 40–55° C. To the mixture was added dropwise 0.06 gram of azobisisobutyroamidine hydrochloric acid salt dissolved in 5 grams of deoxidated water. After the addition the reaction system was heated with stirring at 58–62° C. for 3 hours whereby stable polymer emulsion, milky white in colour having a polymer concentration of 50% was obtained.

(b) Preparation of water- and oil-repellent composition and treatment of fibrous materials 100 parts of the resultant polymer emulsion was mixed with aqueous solution of 20 parts of "Takenon-AS 100" (trademark, antistatic agent containing a polymer of polyethylene glycol methacrylate, Shin-Nakamura Kagaku Kogyo Kabushiki Kaisha, Japan) dissolved in 2000 parts of water. To the resultant mixture was added with stirring 10 parts of guanidine hydrochloride dissolved in 2000 parts of water and the mixture was diluted with 10,000 parts of water to produce water- and oil-repellent composition, milky white in color.

15 parts of amunzen fabric of polyester was dipped in the resultant composition for 3 minutes and squeezed to 80 percent impregnation, based on the weight of the fabric treated. Then the fabric was dried at 80° C. for 20 minutes and heat-treated at 150° C. for 3 minutes.

The fabric thus treated showed no change in color and softness and displayed the following properties.

Water repellency _____ 100.
Oil repellency _____ 7.
Electrostatic voltage and half-value period:
 (measured by using nylon taffeta fabric rubbed at 600 r.p.m. under a load of 500 g. at 20° C. at 65% RH for 3 minutes, the measurement being made in the same conditions as above hereinbelow) _____ 7 v., 1 sec.

No change was observed in these properties after washing or dry-cleaning the fabric 3 times.

Amunzen fabric of polyester dyed with "Sumikaron Blue R" (trademark, disperse dye of Sumitomo Chemical Co. Ltd., Japan) was treated with the composition obtained above in the same manner as above, whereby fabric having the following properties was obtained.

| | Fabric obtained | Contrast (non-treated dyed fabric) |
|---|---|---|
| Water repellency | 100 | 0. |
| Oil repellency | 7 | 0. |
| Electrostatic voltage and half-value period. | 9 v., 1 sec. | 460 v., 6 sec. |
| Color fastness | 4–5 degrees in dry state. 4–5 degrees in wet state. | 4–5 degrees in dry state. 4–5 degrees in wet state. |

For comparison the same dyed fabric was treated in the same manner as above using the same composition except that no guanidine hydrochloride was added to the composition, whereby the fabric having the following properties was obtained.

Water repellency _____ 80+.
Oil repellency _____ 7.
Electrostatic voltage and half-value period _____ 250 v., 4 sec.
Color fastness to rubbing ___ 4–5 degrees in dry state; 4–5 degrees in wet state.

Further, for comparison, the same dyed fabric was treated in the same manner as above using the same composition except that no antistatic agent was added to the composition, whereby the fabric having the following properties was obtained.

Water repellency _____ 100.
Oil repellency _____ 7.
Electrostatic voltage and half-value period _____ 1200 v., 11 sec.
Color fastness to rubbing ___ 4–5 degrees in dry state; 4–5 degrees in wet state.

COMPARATIVE EXAMPLE 1

Water- and oil-repellent composition was prepared in the same manner as in Example 1 except that ammonium chloride was used in the amount shown below in the place of the guanidine hydrochloride and the antistatic agent, "Takenon-AS 100" (trademark, the same as in Example 1), was used in the amount shown below.

The same dyed fabric of polyester as in Example 1 was treated with the above composition in the same manner as in Example 1, whereby fabric having the following properties was obtained.

| | | | |
|---|---|---|---|
| Amount of antistatic agent used (parts) | 20 | 40 | 40 |
| Amount of NH₄Cl used (parts) | 10 | 10 | 20 |
| Water repellency | 100 | 100 | 100 |
| Oil repellency | 7 | 7 | 7. |
| Electrostatic voltage and half-value period | 330 V., 8 sec. | 110 v., 5 sec. | 15 v., 2 sec. |
| Color fastness to rubbing: | | | |
| In dry state | 4–5 | 3 | 3. |
| In wet state | 4–5 | 2–3 | 2–3. |

EXAMPLE 2

(a) Preparation of copolymer of $$(CF_3)_2CF(CF_2)_6CH_2CHCH_2OOCCH=CH_2$$
$$\quad\quad\quad\quad\quad\quad\quad\quad\quad |$$
$$\quad\quad\quad\quad\quad\quad\quad\quad\quad OOCCH_3$$

and 2-ethylhexyl methacrylate.

Aqueous emulsion having 50% concentration of copolymer of $(CF_3)_2CF(CF_2)_6CH_2CH(OOCCH_3)CH_2OOCCH=CH_2$ and 2-ethylhexyl methacrylate was prepared in the same manner as in Example 1–(a) except that $(CF_3)_2CF(CF_2)_6CH_2CH(OOCCH_3)CH_2OOCCH=CH_2$ was used in the place of $(CF_3)_2CF(CF_2)_6CH_2CH(OH)CH_2OOCCH=CH_2$ (b) Preparation of water- and oil-repellent composition and treatment of fibrous material 0.5 part of the resultant aqueous polymer emulsion obtained as above (a) was mixed with stirring with 0.5 part of "Takenon-AS 100" (trademark, the same as in Example 1) dissolved in 20 parts of water and 0.5 part of guanidine hydrochloride dissolved in 50 parts of water. The resultant mixture was diluted with water to produce 100 parts of aqueous water- and oil-repellent composition, milky white in color.

The same dyed fabric as Example 1 was treated with the above composition in the same manner as in Example 1, whereby fabric having the following properties was obtained.

Water repellency _____ 100.
Oil repellency _____ 7.
Electrostatic voltage _____ 10 v.
Color fastness to rubbing ___ 4–5 degrees in dry state;
                               4–5 degrees in wet state.

COMPARATIVE EXAMPLE 2

Water- and oil-repellent composition was prepared in the same manner as in Example 2 except that ammonium chloride was used in the amount shown below in the place of guanidine hydrochloride and the antistatic agent was used in the amount shown below.

The same dyed fabric of polyester as Example 1 was treated with the above composition in the same manner as in Example 1, whereby fabric having the following properties was obtained.

| | | | |
|---|---|---|---|
| Amount of antistatic agent used (parts) | 0.5 | 1 | 1 |
| Amount of NH$_4$Cl used (parts)$^4$ | 0.5 | 0.5 | 1 |
| Water repellency | 100 | 100 | 100 |
| Oil repellency | 7 | 7 | 7 |
| Electrostatic voltage, v | 320 | 12 | 95 |
| Color fastness to rubbing: | | | |
| In dry state | 4–5 | 3 | 3 |
| In wet state | 4–5 | 2 | 2 |

EXAMPLE 3

(a) Preparation of the homopolymer of
$C_8F_{17}CH_2CH_2OOCC(CH_3)=CH_2$

In the same flask as in Example 1 were placed 100 grams of $C_8F_{17}CH_2CH_2OOCC(CH_3)=CH_2$, 5 grams of trimethyloctadecyl ammonium bromide, 1 gram of azobisisobutyroamidine hydrochloride, 15 grams of acetone and 80 grams of deoxidated water, and heated at 58–62° C. in nitrogen stream for 6 hours.

The polymer emulsion thus obtained had a polymer concentration of 50%.

(b) Preparation of antistatic polymer

In a 300-ml. four-necked flask equipped with a reflux condenser, thermometer, dropping funnel and stirrer were placed 37 g. of $CH_3O(CH_2CH_2O)_6OCC(CH_3)=CH_2$, 7 g. of glycidyl methacrylate, 200 g. of dimethylformamide and 0.3 g. of azobisisobutyronitrile. The mixture was stirred homogeneously at room temperature and the temperature of the system was gradually raised to 70° C. The system was stirred at that temperature for 6 hours, whereby slightly viscous polymer solution, light yellow in color, having a concentration of 17% was obtained. Removal of dimethylformamide by distillation gave a viscous polymer. The polymer was yellow in colour and had water-solubility.

(c) Preparation of water- and oil-repellent composition and treatment of fibrous matrial 1.5 parts of the polymer emulsion obtained as above (a) was mixed with stirring with 0.2 part of antistatic polymer of above (b) dissolved in 20 parts of water and 0.5 part of guanidine hydrochloride dissolved in 20 parts of water. The resultant mixture was diluted with water to produce 100 parts of water- and oil-repellent composition, milky white in color.

Taffeta fabric of polyester was treated with the composition obtained as above in the same manner as in Example 1, whereby fabric having the following properties was obtained.

Water repellency _____ 100
Oil repellency _____ 7
Electrostatic voltage _____v__ 25

For comparison the same fabric as above was treated in the same manner as above except that no antistatic polymer was added to the composition. The fabric thus obtained displayed the following properties.

Water repellency _____ 100
Oil repellency _____ 7
Electrostatic voltage _____v__ 2280

Further, for comparison, the same fabric as above was treated in the same manner as above except that no guanidine hydrochloride was added to the composition, whereby fabric having the following properties was obtained.

Water repellency _____ 90
Oil repellency _____ 7
Electrostatic voltage _____v__ 2350

EXAMPLE 4

(a) Preparation of the copolymer of
$C_8F_{17}SO_2N(C_2H_5)CH_2CH_2OOCC(CH_3)=CH_2$
and butadiene In a 100-ml. pressure ampoule were placed 31.5 grams of deoxidated water, 4.7 grams of aceton, 1.25 grams of $C_8F_{17}SO_2NH(CH_2)_3N(CH_3)_2 \cdot HCl$, 0.05 gram of potassium persulfate, 0.125 gram of dodecylmercaptane, 0.125 gram of n-octylmercaptane and 12.5 grams of butadiene, and the ampoule was sealed. The ampoule was heated with shaking at 50° C. for 26 hours to polymerize the monomers. After this reaction, 12.5 grams of $C_8F_{17}SO_2N(C_2H_5)CH_2CH_2OOCC(CH_3)=CH_2$ and 8.8 grams of acetone were further added to the reaction mixture and heated at 50° C. for 16 hours for further polymerization. Thus, polymer emulsion milky white in color having a polymer concentration of 29 percent was obtained.

(b) Preparation of antistatic polymer

In a 300-ml. four-necked flask equipped with a reflux condenser, thermometer, dropping funnel and stirrer were placed 40 g. of $C_{16}H_{33}O(CH_2CH_2O)_{20}OCCH=CH_2$, 2 g. of N-methylol acrylamide, 200 g. of dimethylformamide and 0.5 of azobisisobutyronitrile. The mixture was stirred homogeneously at room temperature and the temperature of the system was gradually raised to 60° C. The system was stirred at that temperature for 10 hours, whereby transparent viscous polymer solution was obtained. The polymer was soluble in acetone and dimethyl formamide but insoluble in water. One part of the resultant polymer solution was mixed with stirring with 99 parts of water to produce 1% aqueous dispersion of the polymer.

(c) Preparation of water- and oil-repellent composition and treatment of fibrous material 1.5 parts of the polymer emulsion prepared as above (a) was mixed with stirring with 2.5 parts of 1% aqueous dispersion of antistatic polymer prepared in the above manner (b) and 0.5 part of guanidine hydrochloride dissolved in 20 parts of water. The mixture was diluted with water to produce 100 parts of water- and oil-repellent composition, milky white in color.

Tropical fabric of polyester was treated with the above water- and oil-repellent composition in the same manner as in Example 1, whereby fabric having the following properties was obtained.

Water repellency _____ 100
Oil repellency _____ 7
Electrostatic voltage _____v__ 25

EXAMPLE 5

Amunzen fabric dyed with the disperse dyes shown in Table 1 below was treated in the same manner as in Example 1 with the water- and oil-repellent composition obtained in Example 1. The color fastness to rubbing of the resultant fabric in wet state was as follows:

TABLE 1

| Dyes used: | Color fastness to rubbing in wet state (degrees) |
|---|---|
| Foron-Blue-E-BL*1) | 4-5 |
| Foron-Black-E-PW*2) | 4 |
| Foron-Brown-S-2BL*3) | 4 |
| Foron-Red-E-2GL*4) | 4 |

NOTE: *1) to *4) are trademarks, disperse dyes of Sandoz Kabushiki Kaisha, Japan.

EXAMPLE 6

One part of the polymer emulsion obtained in the same manner as in Example 2–(a) was mixed with stirring with 0.1 part of "Permax AW-2" (trademark, antistatic agent containing quaternary ammonium salt of diethyl aminoethyl methacrylate, Yoshimura Yukagaku Kabushiki Kaisha, Japan) dissolved in 20 parts of water and 0.1 part of guanidine hydrochloride dissolved in 20 parts of water. The resultant mixture was diluted with water to produce 100 parts of water- and oil-repellent composition, milky white in color.

2 parts of amunzen fabric of polyester was dipped in the composition thus obtained for one minute and squeezed to 80% impregnation based on the weight of the fabric treated. Then the fabric was dried at 80° C. for 10 minutes and heat-treated at 150° for 3 minutes, whereby fabric having the following properties was obtained.

|  | Fabric treated | Contrast (non-treated fabric) |
|---|---|---|
| Water repellency | 100 | 0 |
| Oil repellency | 7 | 0 |
| Electrostatic voltage, v | 28 | 1,900 |

For comparison the same fabric was treated in the same manner as above using the same composition except that guanidine hydrochloride was not added to the composition, which gave fabric having water repellency of 80, oil repellency of 7 and antistatic voltage of 485 v. Further, for comparison, the same fabric was treated in the same manner as above using the same composition except that ammonium chloride was used in the place of guanidine hydrochloride. The fabric thus obtained displayed water repellency of 100 and oil repellency of 7 with high antistatic voltage of 488 v.

EXAMPLE 7

One part of the polymer emulsion obtained in the same manner as in Example 3–(a) was mixed with the predetermined amount of "Permax AW-2" (trademark, the same as in Example 6) and guanidine phosphate in the same manner as in Example 6 to produce water- and oil-repellent composition.

Amunzen fabric of polyester was treated with the above composition in the same manner as in Example 6. Thus fabric having the properties shown in Table 2 below was obtained. The table also shows the properties of the fabric treated in the same manner as above using the same composition except that ammonium monohydrogen phosphate was used in the place of guanidine phosphate.

EXAMPLE 8

(a) Preparation of antistatic polymer

In a 300-ml. four necked flask were placed 60 g. of dimethyl sulfuric acid salt of 2-dimethylaminoethyl methacrylate and 100 g. of methyl Cellosolve. The mixture was heated at 70° C. in nitrogen gas stream and to the mixture was added dropwise 0.05 g. of benzoyl peroxide dissolved in 5 g. of methyl Cellosolve. After the addition the system was heated with stirring at 70–75° C. for 2 hours. To the resultant reaction mixture 35 g. of water was added after being cooled, whereby 30% aqueous solution of water-soluble polymer dissolved in a mixture of water and methyl Cellosolve was obtained.

(b) Preparation of water- and oil-repellent composition and treatment of fibrous material One part of the polymer dispersion obtained in the same manner as in Example 4–(a) was slowly stirred with 0.2 part of 30% aqueous solution of the antistatic agent obtained as above (a) and 0.2 part of guanidine hydrochloride dissolved in 20 parts of water. The resultant mixture was diluted with water to produce 100 parts of water- and oil-repellent composition, milky white in color.

Fabric of polyamide was dipped in the composition thus obtained and squeezed to 50% impregnation based on the weight of the fabric treated. Then the fabric was dried at 80° C. for 10 minutes and heat-treated at 140° C. for 5 minutes, whereby fabric of the following properties was obtained.

| Water repellency | 100 |
|---|---|
| Oil repellency | 7 |
| Electrostatic voltage v | 20 |

EXAMPLE 9

2 parts of the polymer emulsion obtained in the same manner as in Example 2–(a) was mixed with stirring with 1 part of "Aston 900 EP" (trademark, polyethylene glycol polyamine antistatic agent, Millmaster Onyx Corp., U.S.A.) dissolved in 20 parts of water and 0.2 part of guanidine hydrochloride dissolved in 30 parts of water.

The resultant mixture was diluted with water to produce 100 parts of water- and oil-repellent composition, milky white in color.

Amunzen of polyester, taffeta fabric of polyamide and taffeta fabric of polypropylene were respectively treated with the above composition in the same manner as in Example 1. Each fabric thus treated showed water repellency of 100, oil repellency of 7 and excellent antistatic property.

EXAMPLE 10

(a) Preparation of homopolymer of
$C_7F_{15}CH_2OOCCH=CH_2$

In the same flask as in Example 1–(a) were placed 75 parts of $C_7F_{15}CH_2OOCCH=CH_2$, 2.8 parts of sodium lauryl sulfate, 0.4 part of potassium persulfate and 135 parts of deoxidated water. The mixture was then heated in nitrogen gas stream at 50° C. for 3 minutes, whereby polymer emulsion having a concentration of 33% was obtained.

TABLE 2

| Amount of polymer emulsion (part) | Amount of permax | Amount of guanidine phosphate (part) | Amount of ammonium monohydrogen phosphate (part) | Water repellency | Oil repellency | Electrostatic voltage (v.) |
|---|---|---|---|---|---|---|
| 1 | 0.1 | 0.2 |  | 100 | 7 | 6 |
| 1 | 0.1 |  | 0.2 | 100 | 7 | 85 |
| 1 | 1.0 | 0.2 |  | 100 | 7 | 3 |
| 1 | 1.0 |  | 0.2 | 100 | 7 | 16 |
| 1 | 0.05 | 0.2 |  | 100 | 7 | 9 |
| 1 | 0.05 |  | 0.2 | 100 | 7 | 150 |
| 1 | 0.01 | 0.05 |  | 100 | 7 | 18 |
| 1 | 1.00 | 1.00 |  | 100 | 7 | 3 |

(b) Preparation of water- and oil-repellent composition and treatment of fibrous materials One part of the polymer emulsion obtained above (a) was mixed with 0.3 part of "TH–44" (trademark, aqueous dispersion of paraffin wax and polymer of quaternary ammonium salt of dimethylaminoethyl methacrylate, Nikka Chemical Ind. Co., Ltd., Japan) dissolved in 20 parts of water and 0.2 part of each of guanidine salts dissolved in 20 parts of water, the guanidine salts used being specified in Table 3 below. The mixture was diluted with water to produce 100 parts of water- and oil-repellent composition.

Amunzen fabric of polyester dyed with "Foron Brown S–2BL" (trademark, the same as in Example 5) was treated with each composition in the same manner as in Example 6, whereby fabric having the properties shown in Table 3 below was obtained.

TABLE 3

| Kinds of guanidine salts | Water repellency | Oil repellency | Antistatic voltage (v.) | Color fastness to rubbing Dry | Color fastness to rubbing Wet |
|---|---|---|---|---|---|
| Acetate | 100 | 7 | 18 | 4-5 | 4-5 |
| Sulfate | 100 | 7 | 22 | 4-5 | 4-5 |
| Nitrate | 100 | 7 | 30 | 4-5 | 4-5 |
| Phosphate | 100 | 7 | 18 | 4-5 | 4-5 |
| Non-treated fabric | 0 | 0 | 580 | 4-5 | 4-5 |

EXAMPLE 11

Water- and oil-repellent composition was prepared in the same manner as in Example 8 except that 0.6 part of the polymer emulsion obtained as in Example 2–(a) was used in place of the polymer emulsion obtained as in Example 4–(a).

Taffeta fabric of polyester was dipped in the composition thus obtained for 2 minutes and squeezed to 40% impregnation. Then the fabric was dried at 80° C. for 10 minutes and heat-treated at 150° C. for 3 minutes to obtain fabric having water repellency of 100 and oil repellency of 7.

The fabric thus treated was forcibly rubbed against taffeta fabric of polyamide sixty times for 30 seconds and brought to a position one cm. away from cigarette ashes, but none of the ashes were attracted to the fabric, this showing excellent antistatic property. For comparison non-treated fabric of polyester was rubbed against the taffeta fabric of polyamide as above and brought close to cigarette ashes. Even when the fabric was about 10 cm. away from the ashes the fabric attracted a great amount of ashes.

EXAMPLE 12

(a) Preparation of guanidine malonate

Aqueous solution of 191 parts of guanidine hydrochloride dissolved in 1500 parts of water was passed through a column filled with 1500 parts ion exchange resin (Amberlite IRA–400 [OH] type). Then resultant ion exchange liquid was condensed to produce 800 parts of guanidine solution. After a part of the guanidine solution was titrated with 0.1 N hydrochloric acid to determine concentration thereof, the solution was mixed with equivalent amount thereto of 10% aqueous malonic acid solution and the mixture was stirred at room temperature. The resultant mixture was diluted with water to obtain colorless transparent aqueous solution containing 10% reaction product of guanidine and malonic acid.

(b) Preparation of water- and oil-repellent composition and treatment of fibrous material 0.5 part of polymer emulsion obtained in the same manner as in Example 2–(a) was slowly stirred with 0.5 part of "Takenon AS–100" (trademark, the same as in Example 1) dissolved in 20 parts of water and 2 parts of 10% aqueous solution of the reaction product of guanidine and malonic acid obtained as above (a). The resultant mixture was diluted with water to produce 100 parts of water- and oil-repellent composition, milky white in color.

Tropical fabric of polyester was dipped in the above composition for 3 minutes and squeezed to 70% impregnation based on the weight of the fabric treated. Then the fabric was dried at 80° C. for 10 minutes and heat-treated at 150° C. for 3 minutes.

No change was observed in color and softness of the resultant fabric. The fabric displayed the following properties:

| | Fabric obtained | Contrast (non-treated fabric) |
|---|---|---|
| Water repellency | 100 | 0 |
| Oil repellency | 7 | 0 |
| Electrostatic voltage, v | 2 | 500 |

For comparison the same fabric was treated in the same manner as above using the same composition except that the reaction product of guanidine and malonic acid was not added to the composition, whereby fabric having the following properties was obtained.

Water repellency _____ 80
Oil repellency _____ 7
Electrostatic voltage _____v__ 350

Further, for comparison, the same fabric was treated in the same manner as above using the same composition except that "Takenon AS–100" (trademark, the same as in Example 1) was not added to the composition. The fabric obtained showed the following properties:

Water repellency _____ 100
Oil repellency _____ 7
Electrostatic voltage _____v__ 410

EXAMPLE 13

Guanidine solution was obtained in the same manner as in Example 1 except that the ion exchange step was conducted at 50° C. The guanidine solution was mixed with equivalent amount of 10% aqueous maleic acid solution and the mixture was stirred at room temperature. The resultant mixture was diluted with water to produce 10% aqueous solution of reaction product of guanidine and maleic acid.

2 parts of the resultant solution was mixed with 1.5 parts of the polymer emulsion obtained in the same manner as in Example 4–(a) and 0.2 part of antistatic polymer dissolved in 20 parts of water, the polymer being obtained in the same manner as in Example 3–(b). The resultant mixture was diluted with water to produce 100 parts of water- and oil-repellent composition, milky white in color.

Taffeta fabric of polyester was dipped in the composition and squeezed to 40% impregnation based on the weight of the fabric. Then the fabric was dried at 80° C. for 20 minutes and heat-treated at 150° C. for 3 minutes, whereby fabric having the following properties was obtained.

| | Fabric obtained | Contrast (non-treated fabric) |
|---|---|---|
| Water repellency | 100 | 0 |
| Oil repellency | 7 | 0 |
| Electrostatic voltage, v | 8 | 320 |

EXAMPLE 14

Twelve kinds of water- and oil-repellent compositions were prepared in the same manner as in Example 12 by using varied amounts, shown in Table 4 below, of 10% aqueous solution of guanidine-malonic acid reaction product or of ammonium chloride, fluorine-containing polymer emulsion and "TH–44" (trademark, the same as in Example 10).

Amunzen fabric of polyester dyed with "Foron-Blue-E-BL" trademark, the same as in Example 5) was treated with the respective compositions thus obtained in the same manner as in Example 1. The properties of the fabric thus obtained are shown in Table 4 below.

TABLE 4

| Amount of fluorine-containing polymer emulsion (percent) | Amount of "TH-44" (percent) | Amount of guanidine-malonic acid reaction product (percent) | Amount of NH₄Cl | Water repellency | Oil repellency | Electrostatic voltage (v.) | Color fastness to rubbing in wet state |
|---|---|---|---|---|---|---|---|
| 0.5 | 1.0 | 0.2 | | 100 | 7 | 6 | 3-4 |
| 0.5 | 1.0 | 0.05 | | 100 | 7 | 10 | 3-4 |
| 0.5 | 0.5 | 0.1 | | 100 | 7 | 11 | 4 |
| 0.25 | 0.25 | 0.05 | | 100 | 7 | 14 | 4-5 |
| 0.15 | 0.1 | 0.01 | | 100 | 7 | 18 | 4-5 |
| 0.5 | 1.0 | | 0.2 | 100 | 7 | 88 | 3 |
| 0.5 | 1.0 | | 0.05 | 100 | 7 | 200 | 3-4 |
| 0.5 | 0.5 | | 0.1 | 100 | 7 | 115 | 4 |
| 0.25 | 0.25 | | 0.05 | 100 | 7 | 280 | 4-5 |
| 0.15 | 0.1 | | 0.01 | 100 | 7 | 330 | 4-5 |
| 0.5 | 1.0 | | | 80 | 7 | 380 | 3 |
| Non-treated fabric | | | | 0 | 0 | 1,300 | 4-5 |

EXAMPLE 15

Three kinds of water- and oil-repellent composition were prepared in the same manner as in Example 12 in which the following antistatic agents were respectively used in the place of "Takenon AS–100" (trademark, the same as in Example 1).

Antistatic agents used:

"TH-44" (trademark, the same as in Example 10)
"PERMAX AW-2" (trademark, the same as in Example 6)
"Aston 900 EP" (trademark, the same as in Example 9)

Tropical fabrics of polyester were treated with respective compositions in the same manner as in Example 12. The fabrics obtained were excellent in properties as in that obtained in Example 12.

EXAMPLE 16

0.5 part of 20% solution of diethylamino methacrylate-2-ethylhexylamino methacrylate copolymer dissolved in water-butyl Cellosolve mixture was diluted with 20 parts of water and the solution was mixed with 1.5 parts of 30% polymer emulsion prepared in the similar manner as in Example 1-(a) and 5 parts of 10% solution of guanidine-malonic acid reaction product obtained in the same manner as in Example 12. The resultant mixture was diluted with water to produce 100 parts of water- and oil-repellent composition, milky in white in color.

Amunzen fabric of polyester was treated with the above composition in the same manner as in Example 12, whereby fabric having the following properties was obtained.

| | Fabric obtained | Contrast (non-treated fabric) |
|---|---|---|
| Water repellency | 100 | 0 |
| Oil repellency | 7 | 0 |
| Electrostatic voltage, v | 3 | 1,380 |

What we claim is:

1. A water- and oil-repellent composition which consists essentially of an aqueous medium having dispersed therein a fluorine-containing resinous polymer of an ethylenically unsaturated carboxylic acid ester or vinyl ester of a carboxylic acid having a perfluoroalkyl side chain of 3 to 21 carbon atoms in a concentration of 0.05 to 10 weight percent, a water-soluble salt of guanidine in the range of 0.001 to 10 times the weight of said fluorine-containing polymer and an antistatic agent in the range of 0.0003 to 20 times the weight of said fluorine-containing polymer.

2. The water- and oil-repellent composition according to claim 1, in which said fluorine-containing polymer is a polymer containing at least 25 weight percent of one monomer selected from the group consisting of monomers having the formula of

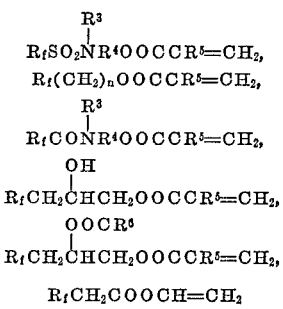

and $$R_fCH=CH(CH_2)_nOOCCR^5=CH_2$$

wherein $R_f$ is a perfluoroalkyl of 3 to 21 carbon atoms, $R^3$ is hydrogen or an alkyl of 1 to 10 carbon atoms, $R^4$ is an alkylene of 1 to 10 carbon atoms, $R^5$ is hydrogen or methyl, $R^6$ is an alkyl or 1 to 17 carbon atoms and $n$ is an integer of 1 to 10.

3. The composition according to claim 1, in which said water-soluble salt of guanidine is a guanidine salt of an inorganic mono- or poly-basic acid.

4. The composition according to claim 1, in which said water-soluble salt of guanidine is a guanidine salt of an organic monocarboxylic acid.

5. The composition according to claim 1, in which said water-soluble salt of guanidine is a guanidine salt of an organic polycarboxylic acid.

6. The water- and oil-repellent composition according to claim 1, in which said antistatic agent is a polymer containing in the molecule alkylene glycol chain having the formula of —$CH_2CH_2O$— or —$CH(CH_3)CH_2O$—.

7. The water- and oil-repellent composition according to claim 1, in which said antistatic agent is a polymer concontaining at least 70 weight percent of a monomer selected from the group consisting of monomers having the formula of

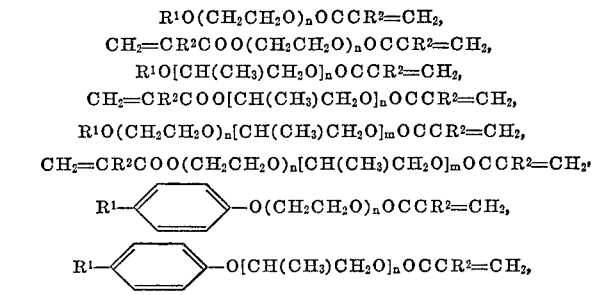

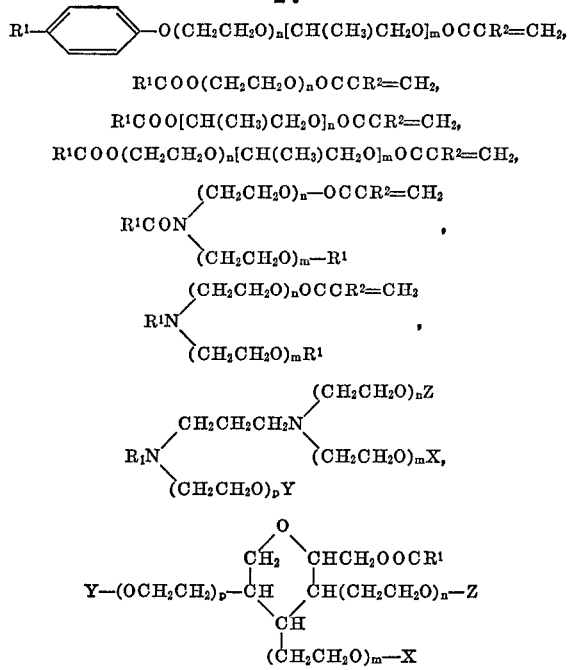

and $HS[CH_2CHR^2COO(CH_2CH_2O)_nCOCHR^2CH_2S]_qH$ wherein $R^1$ is hydrogen or an alkyl group of 1 to 20 carbon atoms and $R^2$ is hydrogen or methyl. At least one of X, Y and Z represents $-OCCR^2=CH_2$, $-CH=CH_2$ or $-CCl=CH_2$ and the others are $R^1$ or $R^1CO$, $R^1$ and $R^2$ being defined above, coincidences $n$, $m$ and $p$ are a number of 1 to 100 respectively, and $q$ is a number of 1 to 200.

8. The water- and oil-repellent composition according to claim 1, in which said water-soluble salt of guanidine is contained in an amount of 0.5 to 5 times the weight of the fluorine-containing polymer in the composition.

9. The water- and oil-repellent composition according to claim 1, in which said antistatic agent is contained in an amount of 0.5 to 10 times the weight of the fluorine-containing polymer in the composition.

References Cited
UNITED STATES PATENTS

| | | |
|---|---|---|
| 3,042,642 | 7/1962 | DeMarco et al. ____ 260—29.6 F |
| 3,242,117 | 3/1966 | Cohen _____ 260—29.6 F |
| 3,423,349 | 1/1969 | Gagliardi _____ 260—29.6 F |
| 3,467,612 | 9/1969 | Gagliardi _____ 260—29.6 F |

HAROLD D. ANDERSON, Primary Examiner

U.S. Cl. X.R.

117—161 UZ; 260—29.4 UA, 29.6 MN, 29.6 H, 29.6 RB, 29.6 RW, 29.6 MQ, 29.7 P, 29.7 N, 29.7 SQ